3,344,603
VARIABLE IMPULSE ROCKET MOTOR
Bernard L. Iwanciow, Sunnyvale, Calif., assignor to United Aircraft Corporation, East Hartford, Conn., a corporation of Delaware
Filed July 28, 1965, Ser. No. 475,406
5 Claims. (Cl. 60—204)

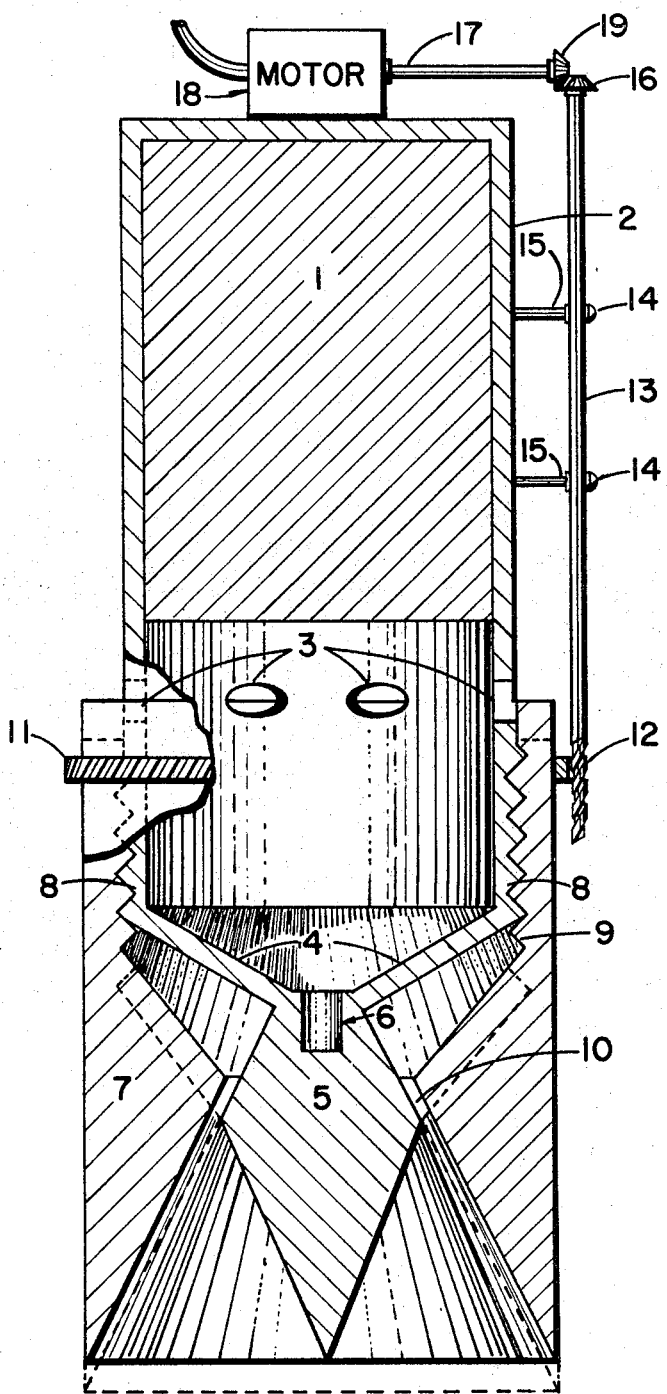

This invention relates to solid propellant rocket motors and, more particularly, to a solid propellant rocket motor having means for varying the impulse produced therefrom.

Solid rocket motors are generally recognized as being the most dependable of all types of rockets. The propellants are fairly stable, can be stored for long periods of time, and the overall rocket system is far less expensive than the liquid or hybrid rocket motor systems. The liquid and hybrid motor systems, however, possess one distinct advantage over the conventional solid propellant rocket motor in that accurate control of the thrust produced by the motor can be obtained throughout the burning period. In liquids and hybrids this is accomplished by varying the flow rate of the fluid materials. As space missions become more complex, the degree of control necessary is greatly increased. If some way could be found to provide a solid propellant rocket motor with a degree of thrust control comparable to that produced in the liquid and hybrid motors, the resulting system would be far more desirable in view of the reduced cost and extreme simplicity and ease of handling which are recognized advantages of solid propellant rocket motors.

Various attempts have been made to provide some degree of control in solid propellant rocket motors, and these include programming a specific burning rate into the configuration of the grain, which is cast into the rocket or providing thrust spoilers which disrupt and disturb the exhaust downstream of the nozzle. Neither of these approaches have been particularly satisfactory. Obviously, the first approach does not provide for any change in burning rate once the rocket has been launched; and the second system, although providing some degree of control, places the controlling elements downstream of the nozzle and produces undesirable and unpredictable effects in the exhaust stream.

According to this invention, I have provided a means whereby solid propellant rocket motors may be accurately controlled throughout their burning time, and the usable thrust varied from 0 to the maximum designed thrust of the rocket and, further, thrust can be reduced to 0 and then subsequently increased or decreased while the rocket motor is burning.

It is accordingly one object of this invention to provide a means for varying the thrust of a solid propellant rocket motor.

It is another object of this invention to provide a thrust control system for a solid rocket motor that does not produce undesirable disturbances in the combustion chamber.

It is a further object of this invention to provide a simple and economical thrust control system for a solid rocket motor.

It is a further object of this system to provide a thrust control system whereby the usable thrust can be varied from 0 to the full design thrust while the rocket motor is burning.

These and other objects of this invention will be readily apparent from the following description with reference to the accompanying drawings, wherein the figure is a cross section view of a rocket motor according to this invention.

Basically, the invention contemplates providing a plurality of radial ports upstream of the nozzle, the total area of the ports being equal to the nozzle port area and providing means for varying the radial port and nozzle port area such that the open port area is always constant. A rocket motor according to this invention consists of a propellant grain 1 mounted within a casing 2. The aft end of casing 2 is open and is provided with nozzle defining means such as a nozzle plug 5 mounted on the aft end of casing 2 by struts 4. The forward end of nozzle plug 5 is provided with a recess in which may be mounted igniter 6. Casing 2 is provided with external circumferential threads 8 adjacent the aft end thereof, and a series of symmetrically disposed opposing radial ports 3 are provided in the casing 2 ahead of the threads. A movable member 7 is provided with internal threads 9 threadably engaged with the external threads 8 of casing 2 whereby member 7 may be longitudinally translated with respect to casing 2 upon relative rotation of member 7 and casing 2. The forward end of member 7 extends past threaded portion 9 for a sufficient distance such that when member 7 is displaced along casing 2 to the forward end of its travel, the ports 3 are completely obstructed by the forward portion of member 7. The aft portion of member 7 is provided with an internal configuration which cooperates with plug 5 to form a nozzle 10 for exhaust of combustion gases produced within casing 2. When member 7 is in its most withdrawn position, the port area between member 7 and plug 5 is the nozzle port area required for maximum thrust of the specific rocket motor. When member 7 is in its most extended position, as shown in dotted lines, the internal configuration of member 7 abuts nozzle plug 5 effectively sealing off the nozzle plug and reducing the nozzle port area 10 to zero, whereas the forward end of member 7 is now moved to such a point that ports 3 are completely opened. Combustion gases can escape through opposing radial ports 3 producing no forward thrust and effectively neutralizing side thrust. The relative area of ports 3 and the configuration of plug 5 and member 7 are so selected that the total area of ports 3 when they are opened is equal to the maximum port area of the nozzle 10, and, further, the configuration of plug 5 and member 7 is so adjusted with respect to ports 3 that at any intermediate position of movable member 7 the total open area of ports 3 and the nozzle port 10 is constant and equal to the fully open nozzle port area. In this manner, the combustion gases generated always have a constant port area through which to escape. Therefore, no fluctuations in chamber pressure are produced even though the effective thrust is varied from zero to the design maximum. The movable member is shown in solid lines in the drawing in an intermediate position and it is evident that combustion gas can escape through both the nozzle port 10 and the partially obstructed opposing radial ports 3.

To provide for relative motion between member 7 and casing 2, a ring gear 11 may be mounted circumferentially on the exterior surface of member 7. Ring gear 11 meshes with worm gear 12 mounted on the end of shaft 13 which may be rotatably supported by means of bearings 14 in supports 15 mounted on casing 2. The forward end of shaft 13 has a right angle gear 16 mounted thereon. Gear 15 meshes with right angle gear 19 on the end of drive shaft 17 of motor 18. Motor 18 is a reversible electric motor deriving its power from any suitable source of electric power in the rocket system which is not shown in the drawing. A suitable control system, also not shown, provides the signals for motor 18 to control the direction of rotation thereof and thereby control the longitudinal motion of member 7. The control system used to actuate motor 18 may either be an automatic control system which senses the environment of the rocket and provides necessary signals, or motor 18 may be directly controlled by radio signals from the earth which are received by the control system. Since the total port area of the radially disposed opposing ports 3 is equal to the maximum nozzle port area 10 and the configuration of member 7 is such that the total open port area at all points between the limits of travel of member 7 is constant and equal to the total area of ports 3 or the maximum nozzle port area 10; the port area at all times during operation of the rocket, for escape of the combustion products generated within casing 2, is constant. Since the total port area is at all times constant regardless of thrust of the rocket motor, the internal chamber pressure is maintained constant. Solid propellant rocket motors are notorious for their sensitivity to fluctuations in chamber pressures. The novel control system of this invention provides for throttling of a solid rocket motor from 0 thrust to full thrust or vice versa without any change at all in the internal combustion pressure; thereby eliminating a major problem that has heretofore been encountered when attempts to throttle solid rocket motor engines have been made.

The invention herein has been disclosed with respect to a specific embodiment thereof; however, the specific embodiment is merely illustrative and is not limiting of the invention. For example, any of the known grain configurations may be employed in the rocket motor to provide any of the known advantages produced from specific grain geometries. A central burning port may be provided and the grain may be provided with a star configuration, for example, which is well-known in the art. Further, the location of the igniter in nozzle plug 5 is not critical, and the igniter may be located at any point within the casing structure or rocket motor may be ignited by the application of heat from external sources. Also, the method for varying the port areas disclosed herein is merely preferred and should not be considered limiting. With respect to shaft 13, it is preferable that it be placed so that it passes the ports 3 at a point intermediate adjacent ports. This is to prevent shaft 13 from being in direct contact with the hot combustion gases escaping through the ports 3. Further, motor 18 and mounting brackets and support brackets 15 need not be mounted on the rocket motor casing; for example, they could be mounted on the vehicle fuselage. The only important element to be kept in mind is that the torque transmitted to member 7 must be transmitted in such a manner as to permit rotation of member 7 relative to casing 2. Therefore, if the driving mechanism is to be mounted on the vehicle superstructure, casing 2 could be fixably mounted to the superstructure, and member 7 could be free to rotate. While member 7 is shown to be in threaded engagement with casing 2 to produce the longitudinal translational motion of the two bodies, such a feature is also not essential. For example, member 7 could be in sliding relationship with casing 2 and the relative motion produced through a hydraulic system which would slide member 7 along casing 2. Of course, suitable seals would have to be provided to escape to prevent the venting of combustion gases through the sliding surfaces. It should also be pointed out the whereas the invention has been disclosed specifically with respect to solid propellant rocket motors wherein the invention produces its greatest advantages, the thrust control system of this invention could also be used in other types of rocket motors such as liquid motors or hybrid motors, either as the primary thrust control system, or as an auxiliary system to function in case of failure of the main system. For example, the thrust control system of this invention could be utilized with a liquid fuel rocket motor, and would function should failure occur in the liquid flow control valves of the propellants. In such a case, even upon failure of the flow control valves, a degree of control could still be maintained by use of this system. These modifications and other modifications within the skill of the art are considered to be within the scope of the instant invention which is only limited by the following claims.

I claim:

1. A variable thrust rocket motor comprising a chamber having a plurality of opposing radial ports and an aft port, the total area of said radially disposed ports being equal to the area of the aft port, means for generating motive fluid in said chamber and in fluid communicating relationship to said radial and aft ports, and means for inversely varying the area of said radial ports with the area of said aft port whereby the total open port area is maintained constant.

2. A solid propellant rocket motor comprising a casing having a plurality of radially disposed opposing ports and an aft port, the combined area of said radially disposed ports being equal to the area of said aft port, a propellant grain mounted in said casing forward of said radially disposed ports, means for varying the area of said radially disposed ports, and means for varying the area of said aft port inversely with the area of said radial ports whereby the effective port area is maintained constant.

3. A method of varying the thrust of a rocket motor comprising a chamber, a nozzle at the aft end of said chamber and opposing radial ports forward of said nozzle, the total area of said ports being equal to the area of said nozzle said method comprising the steps of
   (a) generating gases within said chamber;
   (b) varying the area of said nozzle inversely with the area of said radial ports whereby the total effective open port area is maintained constant, and
   (c) venting said gases through the said open port area.

4. A method of varying the thrust of a rocket motor comprising the steps of
   (a) generating combustion gas in a combustion chamber;
   (b) venting a portion of said combustion gas through a thrust producing nozzle having a predetermined maximum area;
   (c) venting a portion of said combustion gas through opposed ports having a total maximum area equal to said nozzle maximum area whereby no effective thrust is produced, and
   (d) varying the area of said thrust producing nozzle inversely with the area of said opposing ports.

5. A variable thrust rocket motor comprising:
   (a) a casing defining a chamber;
   (b) means for generating a motive fluid in said chamber;
   (c) nozzle defining means at the aft end of said casing;
   (d) opposing radial ports of predetermined total area in said casing forward of said nozzle defining means and in fluid communication with said chamber;
   (e) a member mounted on said casing and longitudinally translatable thereon from a first point where said member obstructs said opposing radial ports to a second point where said member does not obstruct said opposing radial ports, said member being so configured at its aft end to cooperate with said nozzle defining means to form a port area at said first point equal in area to said predetermined total area of said opposing radial ports and at said second point equal to zero and at any intermediate point between said first and second point a port area which when added to the unobstructed area of said opposing radial ports at said intermediate point is equal to said predetermined area, and
   (f) means for translating said member between said said first point and said second point.

No references cited.

CARLTON R. CROYLE, *Primary Examiner.*